United States Patent Office 3,441,942
Patented Apr. 29, 1969

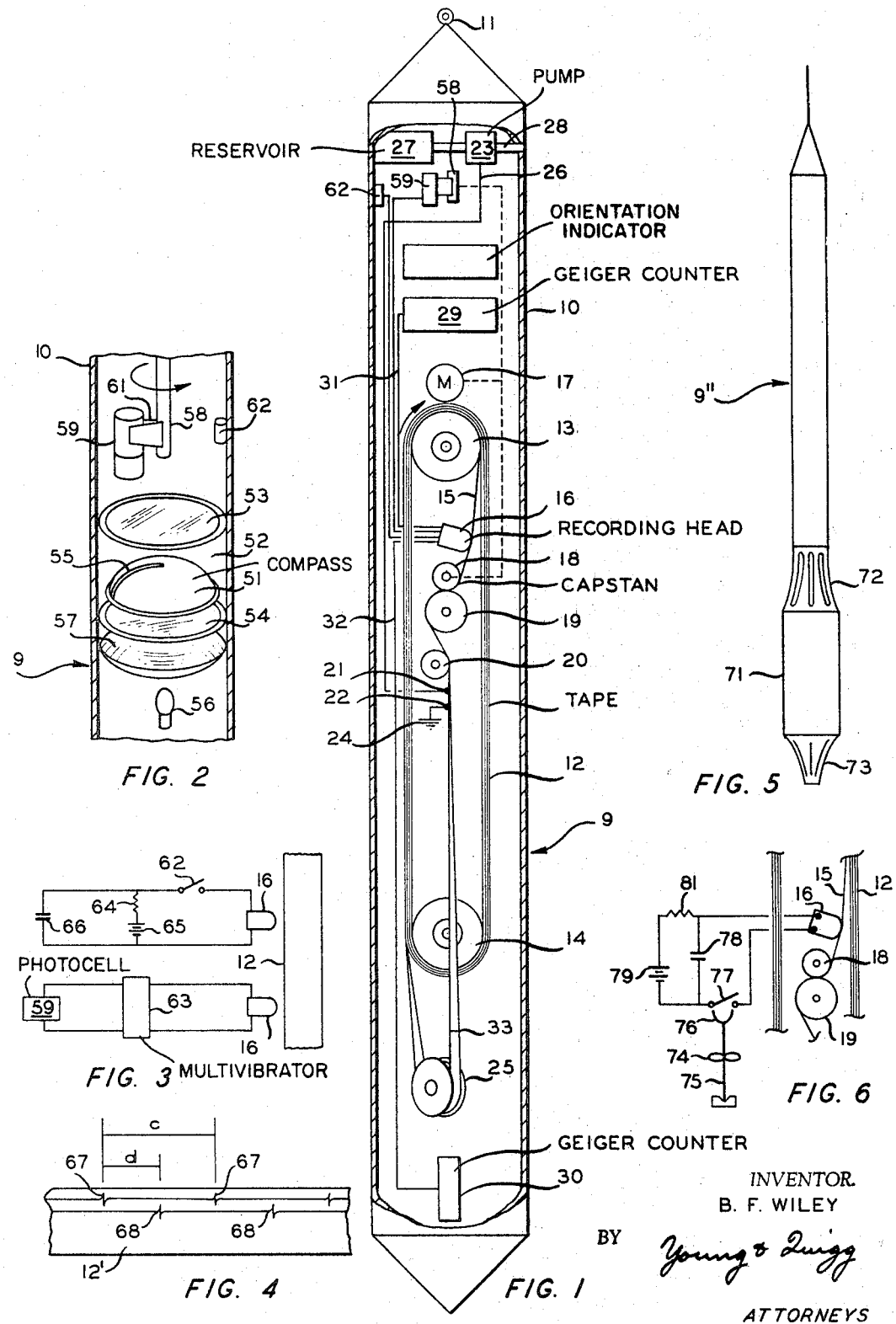

3,441,942
MEASURING AND RECORDING APPARATUS
Bruce F. Wiley, Bartlesville, Okla., assignor to Phillips Petroleum Company, a corporation of Delaware
Filed Dec. 20, 1965, Ser. No. 514,828
Int. Cl. G01d 9/38
U.S. Cl. 346—33    4 Claims

ABSTRACT OF THE DISCLOSURE

A continuous multiple-loop tape recorder is provided with two loop rollers, a drive capstan and a pressure roller in a single plane with a guide roller outside of the plane to withdraw the tape from the inner loop and pass it to the outer loop. The tape can be provided with electrically conductive sections to actuate a switch to control the release of a radioactive tracer, while the outputs of two radiation detectors are recorded on the same tape. The tape drive can actuate an azimuth sensor with the output of the sensor being recorded on the tape. A flow spinner can actuate a switch to apply pulses to the recording tape.

This invention relates to method and apparatus for measuring a variable in a borehole and recording the measured variable. In one aspect the invention relates to method and apparatus for recording signals within a logging sonde. In another aspect the invention relates to method and apparatus for measuring and recording the velocity of fluids in a well. In yet another aspect the invention relates to method and apparatus for determining and recording the orientation of a logging sonde.

It has become desirable in many borehole logging procedures to utilize a logging sonde containing its own recording unit. Magnetic tape recorders have found great utility in the borehole logging art, but difficulties have been encountered in the utilization of continuous magnetic tape recorders in logging sondes, particularly in the contortions of the tape path. Such contortions cause friction and stress in the tape. It has also become desirable to provide improved flow measuring means and/or orientation indicating means suitable for use in the logging sonde containing the improved magnetic tape recording means.

Accordingly, it is an object of the invention to provide improved method and apparatus for recording signals within a logging sonde. Another object of the invention is to provide an improved miniature continuous magnetic tape recorder. Another object of the invention is to provide improved flow measuring and recording means. Yet another object of the invention is to provide improved means for indicating the orientation of the logging sonde. Other objects, aspects and advantages of the invention will be apparent from a study of the disclosure, the drawings and the appended claims to the invention.

In acordance with the invention, an improved continuous magnetic tape recorder suitable for use in logging sondes is provided, wherein the transport mechanism, viz., the capstan, magnetic tape heads and pressure roller, are placed within the tape storage loop to minimize contortions in the tape path. An improved flow measuring and recording system is also provided wherein a flowmeter impeller rotates a magnet adjacent a magnetically actuated switch in the recording circuit which also includes a condenser and means for charging the condenser. In another embodiment of the invention, an improved orientation indicating device is provided for use with the recording means, the orientation indicating device including a compass or gyroscope mechanism which transmits a slit of light and a rotating photocell which detects the slit of light and also actuates a reference position switch.

In the drawings, FIGURE 1 is a diagrammatic representation of a flow rate logging sonde incorporating a magnetic tape recorder and an orientation indicating mechanism in accordance with the invention; FIGURE 2 is a perspective view of the orientation indicating mechanism of FIGURE 1; FIGURE 3 is a schematic representation of the recording circuits for the apparatus of FIGURE 2; FIGURE 4 is an illustration of a tape prepared by the system of FIGURES 2 and 3; FIGURE 5 is an elevation view of a flow rate logging sonde in accordance with another embodiment of the invention; and FIGURE 6 is a schematic representation of the recording circuit used in the sonde of FIGURE 5.

Referring now to FIGURE 1, there is illustrated a logging sonde 9 having a cylindrical casing 10, preferably tapered at both ends to enable the sonde to be readily raised and lowered within a borehole. The upper end of sonde 9 is provided with a holding ring 11 for the attachment of a cable to the sonde for moving the sonde through the borehole. In some instances, it may be desirable to reverse the position of the sonde in the borehole, and for this purpose the lower end of sonde 9 can be provided with another holding ring (not shown).

Positioned within probe 9 is a continuous magnetic tape 12 which serves as both the programming and recording medium in my invention apparatus. Magnetic tape 12 is one continuous piece of tape wound around rollers 13 and 14 a plurality of times to form multiple layers of tape moving between rollers 13 and 14. Each layer of the multiple layers positioned between rollers 13 and 14 is in constant slipping contact with the next inwardly successive layer of tape. The outermost tape layer moving in the direction of the arrow passes around roller 13, passes to roller 14, passes around roller 14, then moves inwardly so as to be between and in slipping contact with the new outermost layer of tape and the next inwardly successive tape layer. In this manner, with each revolution, tape 12 moves inwardly until it is immediately adjacent to roller 13.

The innermost layer 15 of tape 12 moves around roller 13 and past one or more conventional recording and reproducing heads 16 between and in frictional contact with drive capstan 18 and pressure roller 19. Tape 12 can be provided with any desired number of recording tracks and the number of recording and reproducing heads will correspond to the number of recording tracks to be utilized. Movement of the tape as described is effected by a motor means 17 preferably a battery operated motor means, operably connected to capstan 18. Layer 15 of the tape moves around pressure roller 19 and around guide 20 as illustrated in the drawing. Layer 15 of the magnetic tape then passes in continuous contact with electrodes 21 and 22 operably connected to pump 23 and to ground 24, respectively. The layer 15 of the magnetic tape is then rotated as it leaves the plane of rollers 13 and 14 and is passed over pulley 25, after which it is rotated in the opposite direction and returned to the plane of rollers 13 and 14 as the new outermost layer of the multiple layers of tape moving between pulleys 13 and 14.

The positioning of the transport mechanism comprising capstan 18, pressure roller 19 and recording and reproducing heads 16 in the plane of rollers 13 and 14 and the multiple layers of tape, and the positioning of roller 25 out of said plane and beyond roller 14 with respect to roller 13 permits the inner layer 15 of the tape to be withdrawn from the multiple layers of tape, reversed in direction and returned to the multiple layers of tape as the new outermost layer with a minimization of the contortions in the tape path, thereby reducing friction and stress in the tape. As shown in FIGURE 1, there are no twists in the tape on the taut side of capstan 18.

A very novel feature of the tape transport is its ability to use double surface tape in the form of a Moebius loop. This arrangement gives two hours of continuous recording time with what would normally be a one-hour tape. This has been of great value in minimizing transport friction and load. There have been no difficulties in coping with "print through" from opposite sides of the tape and it has been found that all or both surfaces may be effectively used.

The tape loop can be made long to minimize the number of layers or turns required for a given running time. In a current model the distance between rollers 13 and 14 at the ends of the loop is 48 inches. For a one-hour circulation time at a speed of 15/16 inch per second, about 35 turns of tape are required and there is room in the tape guide channels for many more turns.

Another feature of the invention is the utilization of the tape 12 as both the programming means and the recording medium. This is accomplished by placing short strips 33 of conductive foil on tape 12, or inserting sections of conductive tape into tape 12, in the path of electrodes 21 and 22 to complete the circuit to energize pump 23 for the time period represented by the length of the respective strip of foil. Pump 23 has its inlet connected to reservoir 27 which contains a quantity of radioactive tracer material. A portion of the radioactive material is injected through outlet passage 28 into the fluid in the borehole surrounding sonde 9 each time pump 23 is actuated. In the prior art the release of the radioactive tracer material is controlled from the surface equipment, as was the recording of detector signals. In the present system the injection of the radioactive tracer material is controlled by the magnetic tape, which also serves as the recording medium. The spacing of the foil strips 33 on tape 12 represents the time interval at which pump 23 is actuated. Motion of the borehole fluid will carry the tracer material downwardly past upper Geiger counter tube 29 and a short time later past lower Geiger counter tube 30. The outputs of Geiger counter tubes 29 and 30 can be applied to separate recording tracks by respective recording heads 16. In a logging procedure where three minutes is ample time to allow for the maximum travel time of the tracer material between a point adjacent the upper Geiger counter tube 29 to a point adjacent the lower Geiger counter tube 30, and two minutes is sufficient time for the operator to raise the sonde to the next station before the tracer material is again released, the spacing of strips 33 on tape 12 can be arranged to correspond to a cycle time of five minutes. The procedure is repeated until the tape loop has completed its cycle. A timer (not shown) in the sonde can be utilized to start the recorder mechanism after sufficient time has elapsed for the sonde to reach the initial detection station in the well and to turn off the recording mechanism at the end of the cycle of tape 12.

The sonde is then brought to the surface and the signals on tape 12 can be played back by recording and reproducing heads 16 and applied to a surface recorder, for example, a clock-driven multiple channel graphic recorder. As the tape 12 passes again through its transport the strips 33 which had carried the release of the radioactive tracer at the corresponding intervals of time can now be utilized to cause a pen to mark the chart. A short time later the response of upper Geiger counter tube 29 will appear on channel 1 and at a subsequent time the response of lower Geiger counter tube 30 will appear on channel 2. The time as scaled between corresponding peaks on channels 1 and 2 indicates the travel time for the respective station. From these travel time data and a knowledge of borehole diameter, the flow rates can be computed.

Where it is anticipated that the flow to be measured is upward rather than downward, sonde 9 can be inverted and the borehole logged starting from the top and going toward the bottom of the section of interest. Outlet 28 can be placed between Geiger counter tubes 29 and 30. In such circumstances, the time interval between injection and first detection at either Geiger counter tube affords a means for determining the direction as well as the velocity of the fluid moving in the borehole.

Referring now to FIGURES 1 and 2, a magnetic compass 51 is positioned in a fluid filled space 52 within sonde 9. The space 52 is bounded at the upper and lower surfaces thereof by light transparent windows 53 and 54, respectively. Compass 51 is in the form of an opaque hemispherical shell with a transparent slit 55 in the north seeking position. A light source 56 is positioned below window 54. If desired, a lens 57 can be positioned between light sources 56 and window 54 to provide the desired light path. When illuminated from below by light source 56, slit 55 appears from above as a bright line in a dark background.

Located above compass 51 and on an axis which coincides with the axis of compass 51 is a rotating shaft 58. A photocell 59 is mounted on shaft 58 by bracket 51 with the axis of photocell 59 being parallel to and spaced from the axis of shaft 58. Shaft 58 can be connected to and driven by drive motor 17 of the tape recorder. Once each revolution of photocell 59, as the photocell passes over illuminated slit 55 a bright line is imaged on the photocell. In order to provide a reference point, switch 62 is mounted on the inside wall of casing 10 so as to be actuated by photocell 59 once during each revolution of photocell 59.

Referring now to FIGURE 3, the pulse output of photocell 59 caused by the passing of photocell 59 over illuminated slit 55, actuates a one shot multivibrator 63. The output of multivibrator 63 is applied to a recording and reproducing head 16 for recording on tape 12. A resistor 64 and battery 65 are connected in series with each other, and this series circuit is connected in parallel with capacitor 66. One terminal of capacitor 66 is connected directly to one terminal of a recording and reproducing head 16 while the second terminal of capacitor 66 is connected through switch 62 to the second terminal of the respective head 16. Battery 65 charges capacitor 66 whenever switch 62 is opened, and capacitor 66 discharges upon the closing of switch 62, applying a pulse to the head 16.

FIGURE 4 is a visual presentation of the resulting magnetic record on tape 12. Pulses 67 represent the pulses caused by the actuation of switch 62 while pulses 68 represent the pulses from photocell 59 caused by illuminated slit 55. The distance C between adjacent pulses 67 is representative of the azimuth of the reference mark provided by switch 62, with respect to magnetic north. The utilization of tape recorder driving motor 17 to drive shaft 58 eliminates the possibility of inaccuracies due to variations in separate drive means. For logging conditions in which the earth's magnetic field is perturbed by casing or drill pipe an electrically driven gyroscope may be utilized to position the hemispherical shell instead of a magnetic element.

Azimuth data readout from the magnetic tape can be accomplished by several techniques. In one technique where shaft 58 is rotated at a rate of one cycle per second, as the tape 12 moves by playback heads 16, the output pulse from the track containing pulses 68 turn on a 360 c.p.s. oscillator and the output pulse from the track containing pulses 67 turns the oscillator off. The number of cycles in the oscillator output corresponds to the number of degrees between the reference mark and magnetic switch.

Referring now to FIGURE 5, there is illustrated a modified sonde 9″ having a spinner section 71 provided with an intake 72 and an outlet 73 for the passage of borehole fluids through the internal passageway within spinner section 71 to drive a rotor 74 mounted in the passageway. Referring now to FIGURE 6, rotor 74 is mounted on a shaft 75 and causes the rotation of shaft 75 responsive to the rate of flow of the borehole fluids. A magnet 76 is mounted on shaft 75 in such a manner as to actuate switch 77 once during each revolution of shaft 75. One side of magnetically actuated switch 77 is connected to one input terminal of recording head 16 and the other side of switch 77 is connected to the first terminals of capacitor 78 and battery 79. A resistor 81 is connected between the second terminals of capacitor 78 and battery 79. The second terminal of capacitor 78 is also connected to the second input terminal of recording head 16. Battery 79 charges capacitor 78 when switch 77 is open. The closing of switch 77 discharges capacitor 78 to apply a pulse of current to recording head 16.

While the invention has been described in terms of specific embodiments, reasonable variations and modifications are possible within the scope of the disclosure, the drawings and the appended claims to the invention.

I claim:

1. Apparatus comprising a logging sonde, an opaque member positioned in said sonde and aving a transparent slit therein extending from the center of said member, means for causing said slit to point in a predetermined direction, a light source on one side of said member for transmitting light through said slit, a rotatable shaft positioned on the other side of said member and coaxial with said member, a light detector mounted on said shaft and spaced from the axis of said shaft for detecting the light transmitted from said source through said slit once during each revolution of said shaft, a reference mark means mounted adjacent the path of rotation of said light detector to be actuated by said light detector once during each revolution of said shaft, and means for recording the output of said light detector and said reference mark means.

2. Apparatus in accordance with claim 1 wherein said reference mark means comprises a switch; wherein said means for recording comprises at least first and second recording means, a one shot multivibrator, means for connecting the output of said light detector to the input of said multivibrator, means for connecting the output of said multivibrator to the input of said first recording means, a source of D.C. voltage and a resistor connected in series, a capacitor connected in parallel with the series circuit of said source of D.C. voltage and said resistor, means connecting one terminal of said capacitor to one input of said second recording means, and means connecting the second terminal of said capacitor to a second input of said second recording means.

3. Apparatus comprising a continuous loop tape recorder mechanism having first and second rollers positioned in a common plane, a continuous recording tape wound around said first and second rollers a plurality of times to form multiple layers of tape with each of said multiple layers except the innermost layer being in constant slipping contact with the next inwardly successive layer of tape, each of the opposite sides of said tape having a recording surface, a drive capstan and a pressure roller positioned in said plane, a third roller positioned beyond said second roller with respect to said first roller and out of said plane, the innermost layer of tape passing in said plane from said first roller to frictional engagement between said drive capstan and said pressure roller and then leaving said plane to pass around said third roller and returning to said plane as the outermost layer of said multiple layers of tape to form a Moebius loop and recording and reproducing means positioned in said plane and adjacent to said innermost layer of tape between said first roller and said drive capstan; a logging sonde encasing said tape recorder mechanism; an opaque member positioned in said sonde and having a transparent slit therein extending from the center of said member; means for causing said slit to point in a predetermined direction; a light source on one side of said member for transmitting light through said slit; a rotatable shaft positioned on the other side of said member and coaxial with said member; a light detector mounted on said shaft and spaced from the axis of said shaft for detecting the light transmitted from said source through said slit once during each revolution of said shaft; a reference mark means mounted adjacent the path of rotation of said light detector to be actuated by said light detector once during each revolution of said shaft; and means for applying the output of said light detector and said reference mark means to said recording and reproducing means.

4. Apparatus in accordance with claim 3 wherein said reference mark means comprises a switch; wherein said recording and reproducing means comprises at least first and second recording means; and wherein said means for applying comprises a one shot multivibrator, means for connecting the output of said light detector to the input of said multivibrator, means for connecting the output of said multivibrator to the input of said first recording means, a source of D.C. voltage and a resistor connected in series, a capacitor connected in parallel with the series circuit of said source of D.C. voltage and said resistor, means connecting one terminal of said capacitor to one input of said second recording means, and means connecting the second terminal of said capacitor to a second input of said second recording means.

References Cited

UNITED STATES PATENTS 2,857,164  10/1958  Camras _____ 274—4

RICHARD B. WILKINSON, *Primary Examiner.*

EDITH C. SIMMONS, *Assistant Examiner.*